(12) United States Patent
Zeng

(10) Patent No.: US 11,782,321 B2
(45) Date of Patent: Oct. 10, 2023

(54) ARRAY SUBSTRATE, DRIVING METHOD OF ARRAY SUBSTRATE, AND DISPLAY DEVICE

(71) Applicant: Shanghai Tianma Microelectronics Co., Ltd., Shanghai (CN)

(72) Inventor: Yang Zeng, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 38 days.

(21) Appl. No.: 17/682,493

(22) Filed: Feb. 28, 2022

(65) Prior Publication Data

US 2022/0236615 A1 Jul. 28, 2022

(30) Foreign Application Priority Data

Sep. 30, 2021 (CN) .......................... 202111168847.7

(51) Int. Cl.
*G02F 1/1362* (2006.01)
*G02F 1/1368* (2006.01)
*G09G 3/36* (2006.01)

(52) U.S. Cl.
CPC ...... *G02F 1/136286* (2013.01); *G02F 1/1368* (2013.01); *G02F 1/136254* (2021.01); *G09G 3/3614* (2013.01); *G09G 3/3633* (2013.01)

(58) Field of Classification Search
CPC ......... G02F 1/136254; G02F 1/136286; G02F 1/1368; G09G 2310/0205; G09G 2310/067; G09G 3/003; G09G 3/3614; G09G 3/3633
See application file for complete search history.

(56) References Cited

U.S. PATENT DOCUMENTS

| | | | | |
|---|---|---|---|---|
| 2005/0024316 A1* | 2/2005 | Ohta | .................... | G09G 3/3688 345/100 |
| 2008/0170057 A1* | 7/2008 | Park | .................... | G09G 3/3688 345/87 |
| 2021/0280120 A1* | 9/2021 | Zhang | .................. | G09G 3/3688 |
| 2022/0157247 A1* | 5/2022 | Yue | ....................... | G09G 3/3233 |

FOREIGN PATENT DOCUMENTS

| | | |
|---|---|---|
| CN | 106324926 A | 1/2017 |
| CN | 111679527 A | 9/2020 |

* cited by examiner

*Primary Examiner* — Richard J Hong
(74) *Attorney, Agent, or Firm* — KDW Firm PLLC

(57) ABSTRACT

An array substrate includes pixel electrodes arranged in an array, a plurality of scan lines extending along the row direction of the array and arranged along the column direction of the array and a plurality of data lines extending along the column direction and arranged along the row direction. One group of data lines includes a first data line and a second data line. The loaded drive voltage of the first data line and the loaded drive voltage of the second data line are different in the same frame. The driving process of one frame includes a reset stage and a display stage. At the reset stage, the first data line is connected to the second data line. At the display stage, the first data line is disconnected from the second data line.

21 Claims, 15 Drawing Sheets

Connect a first data line to a second data line at a reset stage — S110

Disconnect the first data line from the second data line, perform progressive-scan to control the data lines by the scan lines to connect to each row of pixel electrodes, and charge connected pixel electrodes by the data lines at a display stage — S120

ARRAY SUBSTRATE, DRIVING METHOD OF ARRAY SUBSTRATE, AND DISPLAY DEVICE

CROSS-REFERENCE TO RELATED APPLICATION

This application claims priority to Chinese Patent Application No. 202111168847.7 filed Sep. 30, 2021, the disclosure of which is incorporated herein by reference in its entirety.

TECHNICAL FIELD

Embodiments of the present disclosure relate to spatial light modulation technologies and, in particular, to an array substrate, a driving method of an array substrate, and a display device.

BACKGROUND

With the development of science and technology, technologies for forming and reproducing three-dimensional (3D) images/videos have attracted more and more attention from researchers in recent years. A conventional two-dimensional (2D) image system provides only image and video data projected to a plane view, but a 3D image system can provide viewers with fully real image data. Media involving 3D images/videos is new concept media that can implement virtual reality and can better optimize visual information and will lead the next generation of display devices.

In 3D reproduction, a stereoscopic method, an autostereoscopic method, a volume method, a holographic method, and an integral imaging method are generally used. The holographic method uses laser beams so that the 3D images/videos can be viewed with naked eyes. Because the holographic method has excellent visual stereoscopic characteristics so that viewers do not feel any fatigue, the holographic method is the most ideal method. The basic process of the holographic method for implementing 3D display is to convert the phase and amplitude of each point of light wave of object into spatially varying intensity by using the principle of interference, thereby recording all information of the light wave of object by using the contrast and the interval between interference fringes to form a hologram. Then reference light beams are used to illuminate the hologram to reconstruct (or reproduce) original object light beams, thereby producing a 3D image/video.

There is a new technology, computer-generated holography (CGH). The computer-generated holography is a method of digitally generating holographic interference patterns. A holographic interference pattern is generated through a computer system and sent to a spatial light modulator such as a liquid crystal spatial light modulator (LCSLM), and then a 3D image/video corresponding to the holographic interference pattern is reconstructed or reproduced through irradiating reference light beams to the spatial light modulator. However, the existing liquid crystal spatial light modulator has problems such as low frame rate and poor display effect.

SUMMARY

Embodiments of the present disclosure provide an array substrate, a driving method of an array substrate and a display device. The array substrate can be applied to a liquid crystal spatial light modulator. The array substrate can quickly reset data lines during driving, thereby solving the problems of large integrated circuit (IC) load and slow charging speed when the global pixel voltage of the spatial light modulator is reset.

In a first aspect, embodiments of the present disclosure provide an array substrate. The array substrate includes a plurality of pixel electrodes arranged in an array, a plurality of scan lines extending along the row direction of the array and arranged along the column direction of the array and a plurality of data lines extending along the column direction and arranged along the row direction.

The plurality of data lines includes at least one group of data lines, each of the at least one group of data lines includes a first data line and a second data line, and a loaded drive voltage of the first data line and a loaded drive voltage of the second data line are different in the same frame.

The driving process of one frame includes a reset stage and a display stage.

At the reset stage, the first data line is configured to be electrically connected to the second data line.

At the display stage, the first data line is configured to be disconnected from the second data line, the plurality of scan lines are configured to perform a progressive scan to control the plurality of data lines to be electrically connected to a corresponding row of pixel electrodes, and the plurality of data lines are configured to charge connected pixel electrodes.

In a second aspect, embodiments of the present disclosure further provide a driving method of an array substrate. The driving method includes steps described below.

At a reset stage of a driving process of one frame, a first data line is electrically connected to a second data line, where the first data line and the second data line are included in each of at least one group of data lines from the plurality of data lines, a loaded drive voltage of the first data line and a loaded drive voltage of the second data line are different in a same frame, the array substrate includes a plurality of pixel electrodes arranged in an array, a plurality of scan lines extending along a row direction of the array and arranged along a column direction of the array, and a plurality of data lines extending along the column direction and arranged along the row direction.

At a display stage of the driving process of the frame, the first data line is disconnected from the second data line, the plurality of scan lines performs progressive scan to control the plurality of data lines to electrically connect to a corresponding row of pixel electrodes, and the plurality of data lines charge the connected pixel electrodes.

In a third aspect, embodiments of the present disclosure further provide a display device including an array substrate.

The array substrate includes a plurality of pixel electrodes arranged in an array, a plurality of scan lines extending along a row direction of the array and arranged along a column direction of the array, and a plurality of data lines extending along the column direction and arranged along the row direction. The plurality of data lines includes at least one group of data lines. Each of the at least one group of data lines includes a first data line and a second data line. A loaded drive voltage of the first data line and a loaded drive voltage of the second data line are different in a same frame. A driving process of one frame includes a reset stage and a display stage. At the reset stage, the first data line is configured to be electrically connected to the second data line. At the display stage, the first data line is configured to be disconnected from the second data line, the plurality of scan lines are configured to perform a progressive scan to control the plurality of data lines to be electrically connected to a corresponding row of pixel electrodes, and the plurality of data lines are configured to charge connected pixel electrodes.

DETAILED DESCRIPTION

Figure 1:
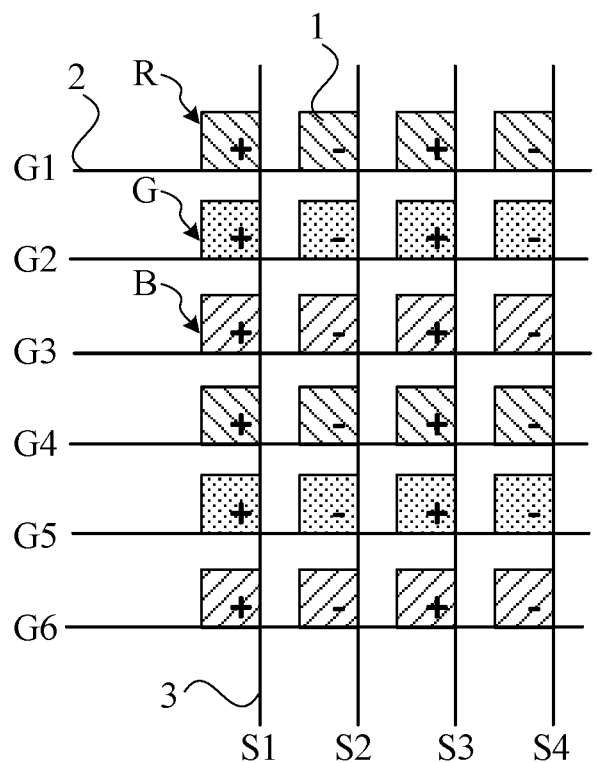
FIG. 1 is an equivalent circuit diagram illustrating the circuit structure of an array substrate according to the related art.

The present disclosure is further described hereinafter in detail in conjunction with drawings and embodiments. It is to be understood that embodiments described hereinafter are intended to explain the present disclosure and not to limit the present disclosure. Additionally, it is to be noted that for ease of description, only part, not all, of structures related to the present disclosure are illustrated in the drawings.

Terms used in embodiments of the present disclosure are merely used to describe embodiments and not intended to limit the present disclosure. It is to be noted that nouns of locality, including "on", "below", "left" and "right", used in embodiments of the present disclosure are described from the angles illustrated in the drawings and are not to be construed as a limitation to embodiments of the present disclosure. Additionally, in the context, it is to be understood that when an element is formed "on" or "below" another element, the element may be directly formed "on" or "below" another element, or may be indirectly formed "on" or "below" another element via an intermediate element. The terms "first", "second" and the like are merely used for description and used to distinguish between different components rather than indicate any order, quantity, or importance. For those of ordinary skill in the art, the preceding terms can be construed according to specific situations in the present disclosure.

Figure 2:
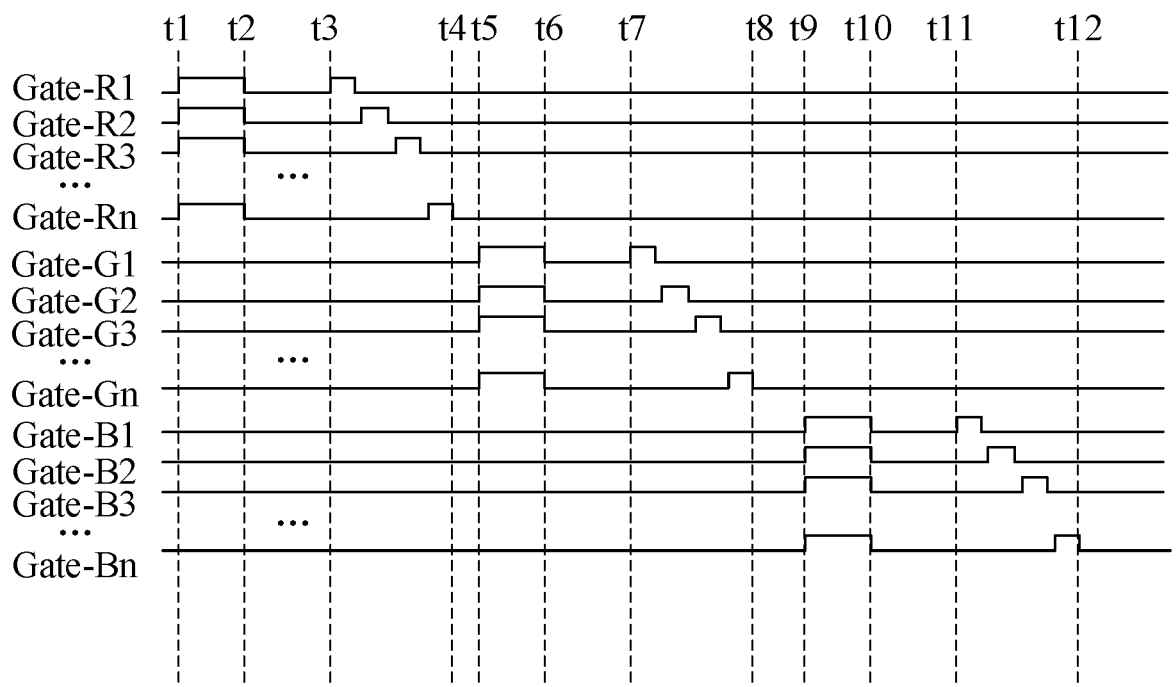
FIG. 2 is a drive timing sequence diagram of an array substrate according to the related art.

FIG. 1 is an equivalent circuit diagram illustrating the circuit structure of an array substrate according to the related art. FIG. 2 is a drive timing sequence diagram of an array substrate according to the related art. Referring to FIG. 1, the array substrate includes a plurality of pixel electrodes 1 arranged in an array, and each pixel electrode 1 corresponds to one sub-pixel. Sub-pixels may include a plurality of sub-pixels of different colors, such as red sub-pixels R, green sub-pixels G, and blue sub-pixels B. Exemplarily, each row of pixel electrodes 1 in FIG. 1 corresponds to sub-pixels of one color, the red sub-pixels R, green sub-pixels G, and blue sub-pixels B are arranged alternately in sequence along the column direction. The array substrate further includes a plurality of scan lines 2 extending along the row direction of the array and arranged along the column direction of the array and a plurality of data lines 3 extending along the column direction and arranged along the row direction. Exemplarily, FIG. 1 shows six scan lines G1 to G6 and four data lines S1 to S4. In order to avoid display problems caused by the polarization of liquid crystal molecules during the driving process when the array substrate is driven, drive voltages of sub-pixels in different columns are usually set to be different. For example, a column inversion driving mode in which polarities of drive voltages of sub-pixels in adjacent columns are opposite is adopted. As shown in FIGS. 1, S1 and S3 are loaded with positive voltages, denoted by "+", and S2 and S4 are loaded with negative voltages, denoted by "−". At the next driving cycle, polarities of drive voltages are reversed, that is, S1 and S3 are loaded with negative voltages, and S2 and S4 are loaded with positive voltages. Since the response speed of the liquid crystal in a spatial light modulator is relatively slow, it is necessary to turn on all scan lines of a certain color at the beginning of a frame and write all sub-pixels of the color into a reference zero voltage Vcom for a global reset, thereby accelerating the liquid crystal response. It is to be noted that the positive voltages and negative voltages described in this embodiment are only relative values relative to the reference zero voltage Vcom, where the positive voltages are greater than Vcom and the negative voltages are less than Vcom. Referring to FIG. 2, at t1 to t2 time period, all scan lines Gate-R1 to Gate-Rn of red sub-pixels are controlled to be turned on (high level), the data lines output a reset voltage Vcom, and at t3 to t4 time period, scan lines Gate-R1 to Gate-Rn of red sub-pixels are controlled to be turned on in sequence, and the data lines write corresponding data signals; at t5 to t6 time period, all scan lines Gate-G1 to Gate-Gn of green sub-pixels are controlled to be turned on, the data lines output a reset voltage Vcom, and at t7 to t8 time period, scan lines Gate-G1 to Gate-Gn of green sub-pixels are controlled to be turned on in sequence, and the data lines write corresponding data signals; and at t9 to t10 time period, all scan lines Gate-B1 to Gate-Bn of blue sub-pixels are controlled to be turned on, and the data lines output a reset voltage Vcom, and at t11 to t12 time period, scan lines Gate-B1 to Gate-Bn of blue sub-pixels are controlled to be turned on in sequence, and the data lines write corresponding data signals. In the case of adopting the column inversion driving mode, all sub-pixels connected to the same data line need to be converted from the same polarity voltage to Vcom during the global reset. Existing liquid crystal spatial light modulators need to perform a global reset when frame switching is required, but IC load of a driver chip is very large during the global reset, and the driver chip needs to take a long time to complete charging. As a result, the frame rate is reduced and the display is affected.

To solve the above problems, this embodiment of the present disclosure provides an array substrate. The array substrate may be applied to a liquid crystal spatial light modulator, or may be applied to a liquid crystal display panel. In this embodiment, the array substrate is applied to the liquid crystal spatial light modulator as an example for description.

Figure 3:
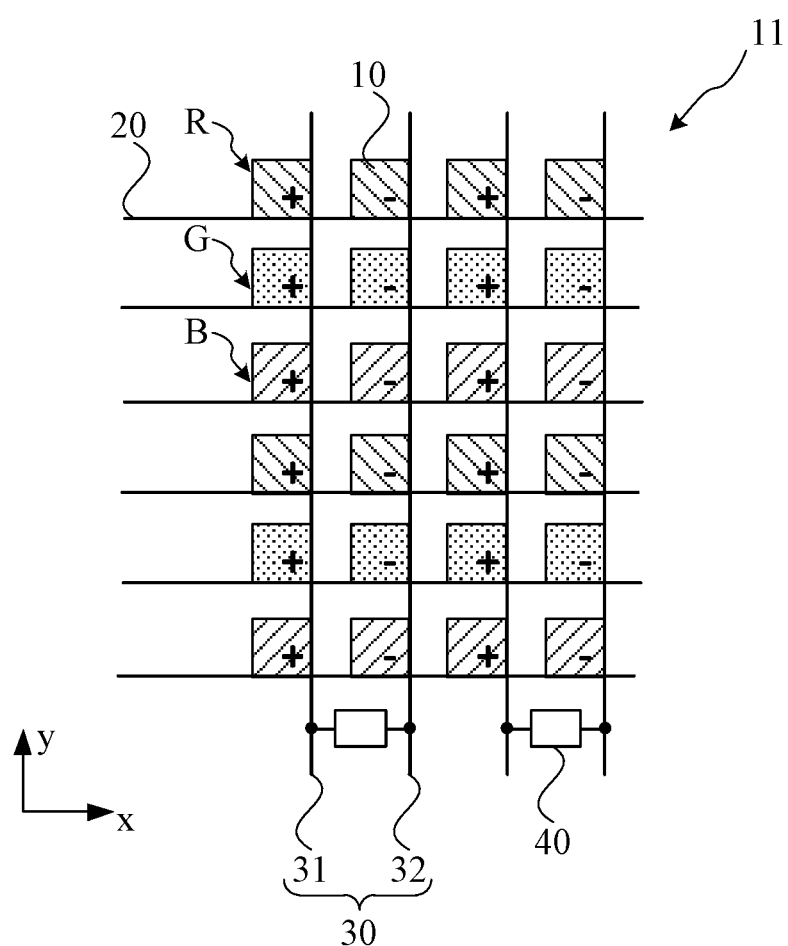
FIG. 3 is an equivalent circuit diagram illustrating the circuit structure of an array substrate according to embodiments of the present disclosure.

FIG. 3 is an equivalent circuit diagram illustrating the circuit structure of an array substrate according to embodiments of the present disclosure. Referring to FIG. 3, the array substrate 11 according to this embodiment includes a plurality of pixel electrodes 10 arranged in an array, and each pixel electrode 10 corresponds to one sub-pixel. Sub-pixels may include a plurality of sub-pixels of different colors, such as red sub-pixels R, green sub-pixels G, and blue sub-pixels B. Exemplarily, each row of pixel electrodes 10 in FIG. 3 corresponds to sub-pixels of one color, the red sub-pixels R, green sub-pixels G, and blue sub-pixels B are arranged alternately in sequence along the column direction. In other embodiments, each column of pixel electrodes 10 may correspond to sub-pixels of one color, and the red sub-pixels R, the green sub-pixels G, and the blue sub-pixels B are arranged alternately in sequence along the row direction. Sub-pixels of other colors may also be provided, such as red sub-pixels, green sub-pixels, blue sub-pixels and white sub-pixels, which are not limited by this embodiment of the present disclosure. A plurality of scan lines 20 extend along the row direction x of the array and are arranged along the column direction y of the array, and a plurality of data lines 30 extend along the column direction y and are arranged along the row direction x, where one of the plurality of data lines 30 is connected to pixel electrodes 10 in a column through a plurality of transistors. The data lines 30 are configured to write data voltages to the pixel electrodes 10, and one scan line 20 is connected to a gate of a transistor corresponding to pixel electrodes 10 in a row, the scan lines are configured to control turn-on and turn-off of transistors, thereby controlling the data lines 30 to write data voltages to corresponding pixel electrodes. One data line 30 includes a first data line 31 and a second data line 32, and a loaded drive voltage of the first data line 31 and a loaded drive voltage of the second data line 32 are different in the same frame. The driving process of one frame includes a reset stage and a display stage. At the reset stage, the first data line 31 is configured to connect to the second data line 32, thereby increasing the reset speed of the data line 30. At the display stage, the first data line 31 is configured to be disconnected from the second data line 32, the scan lines 20 are configured to perform a progressive scan to control the data lines 30 to connect to a corresponding row of pixel electrodes 10, and the data lines 30 are configured to charge the connected pixel electrodes 10.

The array substrate 11 may be an array substrate in a liquid crystal spatial light modulator, and in an embodiment of the present disclosure, the liquid crystal spatial light modulator may be applied to a three-dimensional hologram display device. The array substrate 11 may also be an array substrate in the liquid crystal display panel. The liquid crystal spatial light modulator differs from the liquid crystal display panel in that the liquid crystal light modulator does not need to be provided with backlight, and other structures of the liquid crystal light modulator are similar to those of the liquid crystal display panel. The loaded drive voltage of the first data line 31 and the loaded drive voltage of the second data line 32 are different in the same frame, thereby reducing the influence of coupling effect. In an embodiment of the present disclosure, in the same frame, a polarity of the loaded drive voltage of the first data line 31 and a polarity of the loaded drive voltage of the second data line 32 are opposite. Further, a drive voltage value of the first data line 31 and a drive voltage value of the second data line 32 may be set to be equal, so that the first data line 31 may be configured to directly connect to the second data line 32 to implement reset at the reset stage, and reference signal lines are not required to connect externally for loading reset voltage, and the reset voltage is not required to be additionally loaded. In some embodiments, the charge neutrality between the first data line 31 and the second data line 32 may be implemented to achieve an autonomous reset effect of data lines, that is, the reset effect of the data lines may be achieved without the intervention of external signals. In other embodiments, reset signal lines may be connected to data lines, and a reset voltage may be applied through the reset signal lines while the first data line 31 is connected to the second data line at the reset stage, thereby accelerating the reset speed. It is also possible to set only the loaded drive voltage of the first data lines 31 and the loaded drive voltage of the second data line 32 to have a preset voltage difference rather than opposite polarities, and the short circuit of the first data line 31 and the second data line 32 also have the technical effect of accelerating reset.

With continued reference to FIG. 3, in this embodiment, the first data line 31 and the second data line 32 are disposed adjacent to each other, so that in response to the polarity of the loaded drive voltage of the first data line 31 and the polarity of the loaded drive voltage of the second data line 32 being opposite, column inversion driving can be implemented, thereby lowering the influence of coupling capacitance. The array substrate 11 further includes connection portions 40 configured to connect the first data lines 31 to the second data lines 32. At the reset stage, the first data line 31 is connected to the second data line 32 through a connection portion 40. At the display stage, the first data line 31 is disconnected from the second data line 32, thereby respectively charging pixel electrodes 10 of corresponding column. Further, when the reset of the data lines 30 is performed, the scan lines 20 are configured to simultaneously control the data lines 30 to connect to the pixel electrodes 10 corresponding to the data lines 30, so that the pixel electrodes 10 are also reset.

In a technical solution of this embodiment of the present disclosure, the driving process of a frame is divided into the reset stage and the display stage. At the reset stage, the first data line is configured to connect to the second data line so that charges between the first data line and the second data line are transferred, and the reset speed is accelerated. At the display stage, the first data line is disconnected from the second data line, the scan lines are configured to perform a progressive scan to control the data lines to connect to a row of pixel electrodes which are being scanned, different data lines are connected to different pixel electrodes, and the data lines are configured to charge the pixel electrodes. Therefore, the driving of all sub-pixels is implemented, thereby solving the problems of large IC load and slow charging speed when the global pixel voltage of the spatial light modulator is reset.

Figure 4:
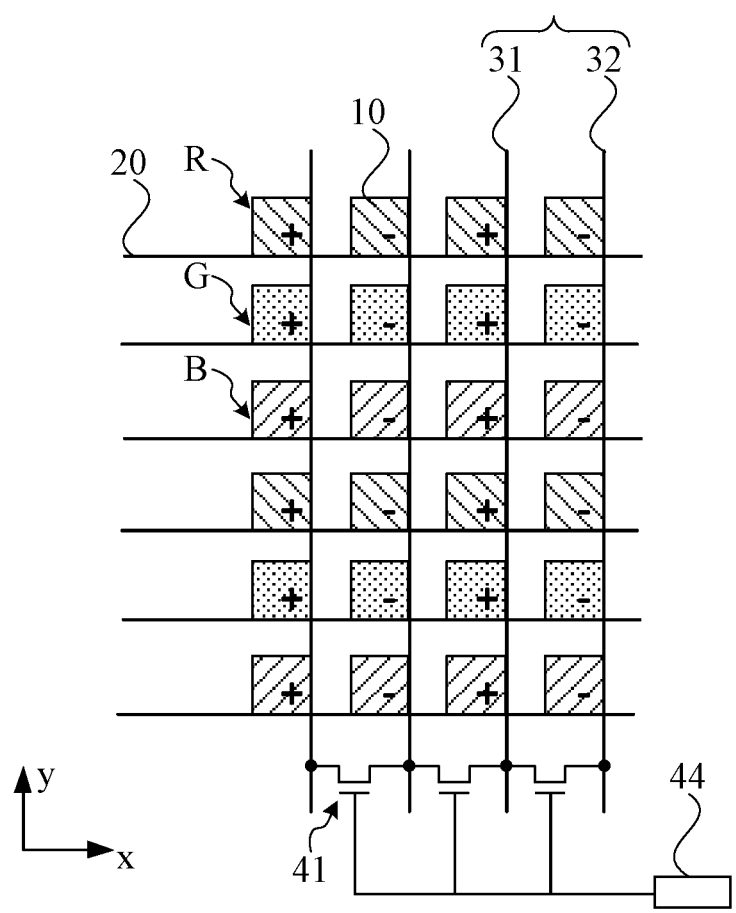
FIG. 4 is an equivalent circuit diagram illustrating the circuit structure of another array substrate according to embodiments of the present disclosure.

For the array substrate 11 according to this embodiment of the present disclosure, at the reset stage, the first data line 31 is configured to connect to the second data line, and at the display stage, the first data line 31 is disconnected from the second data line 32, that is, the connection portions 40 act as switches. FIG. 4 is an equivalent circuit diagram illustrating the circuit structure of another array substrate according to embodiments of the present disclosure. Referring to FIG. 4, in an embodiment of the present disclosure, the array substrate 11 further includes a plurality of switch units 41, a first terminal of one switch unit 41 is connected to the first data line 31, a second terminal of the switch unit 41 is connected to the second data line 32, a control terminal of the switch unit 41 is connected to a switch signal terminal 44, and the switch signal terminal is configured to control the switch unit 41 to turn on at the reset stage.

The switch units 41 may be transistors, the first terminal of the switch unit may be one of a source or a drain, the second terminal of the switch unit may be the other of the source or the drain, and the control terminal of the switch unit is a gate. In an implementation, the switch units 41 may be formed simultaneously with transistors in the display region where the pixel electrodes 10 are located. Exemplarily, FIG. 4 shows that the switch units 41 are all transistors of the same type (N-type transistors shown in FIG. 4), and the control terminals of the switch units 41 are connected to the switch signal terminal through the same signal line. In other embodiments, the switch units 41 may be P-type transistors, or include both P-type transistors and N-type transistors. It is only necessary to connect the gates of the transistors to the corresponding switch signal terminals and turn the gates on at the reset stage. It is to be noted that at the display stage, the switch signal terminal is configured to control the switch unit 41 to turn off, and the electrical connection between the first data line 31 and the second data line 32 is configured to be disconnected, so that the first data line 31 and the second data line 32 are configured to charge pixel electrodes 10 of corresponding column, thereby implementing normal driving.

In an embodiment of the present disclosure, first data lines and second data lines are alternately disposed along the row direction. At least k consecutively adjacent first data lines and second data lines are connected through k−1 switch units, where k is an integer greater than or equal to 2.

Figure 5:
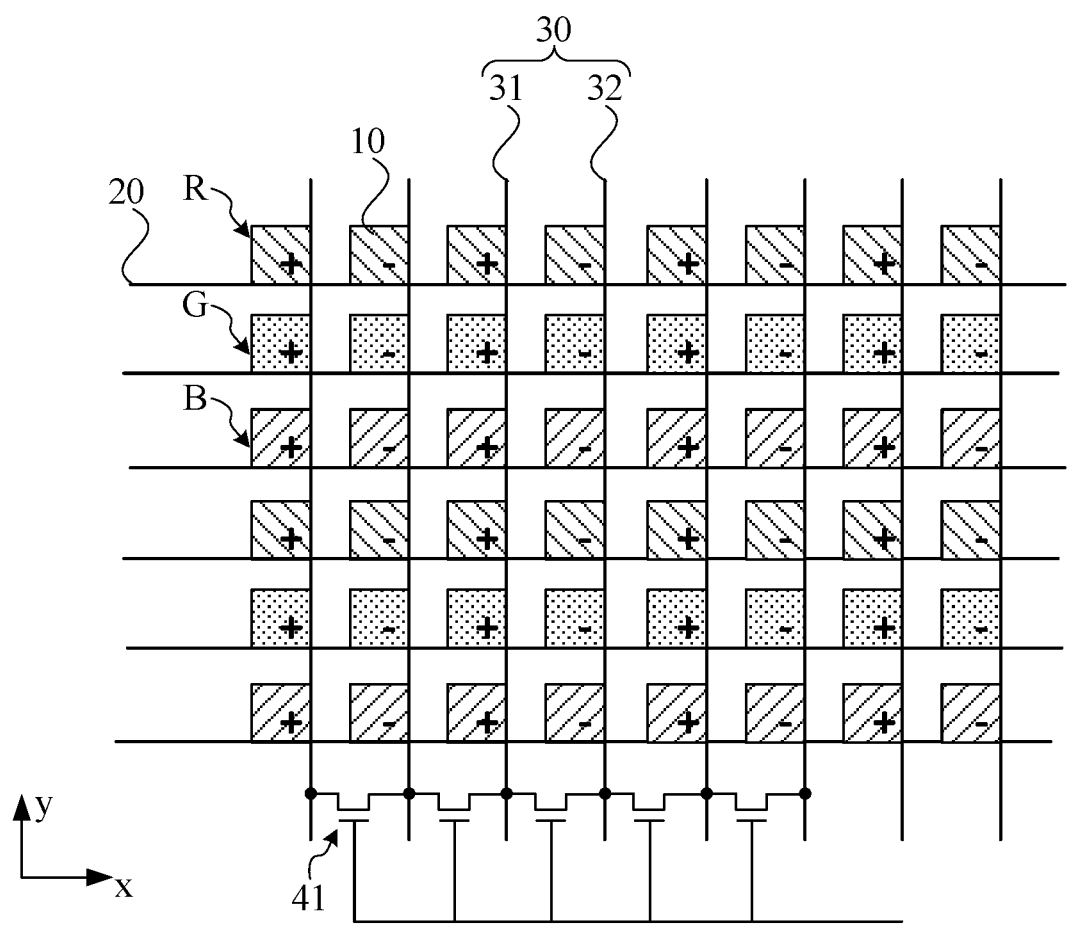
FIG. 5 is an equivalent circuit diagram illustrating the circuit structure of another array substrate according to embodiments of the present disclosure.

Exemplarily, FIG. 5 is an equivalent circuit diagram illustrating the circuit structure of another array substrate according to embodiments of the present disclosure. Referring to FIG. 5, first data lines 31 and second data lines 32 are alternately disposed along the row direction x. Eight data lines are exemplarily shown in FIG. 5. This embodiment takes k=6 as an example. Six consecutively adjacent first data lines 31 and second data lines 32 are connected through five switch units 41. That is, one first data line 31 and one second data line 32 that are adjacent to each other are connected through one switch unit 41, that is, the i-th data line and the (i+1)-th data line are connected through the i-th switch unit, i is a positive integer, and i≤k. In other embodiments, k may be equal to the total number of the first data lines 31 and the second data lines 32, and at the reset stage, all data lines are configured to be electrically connected through switch units, thereby ensuring that all data lines implement reset at a fast speed.

In the embodiments of FIG. 4 and FIG. 5, the switch units 41 are all located at one end of the data lines. In another embodiment, the switch units 41 may be disposed at two ends of the data lines in order to avoid an inconsistent charge release rate at the two ends of the data lines. In an embodiment of the present disclosure, along the row direction, the 2a-th switch unit is disposed on the first side of the pixel electrode array, and the (2a+1)-th switch unit is disposed on the second side of the pixel electrode array. The first side and the second side are opposite sides of the pixel electrode array in the column direction, and 2a+1 is a positive integer smaller than k.

Figure 6:
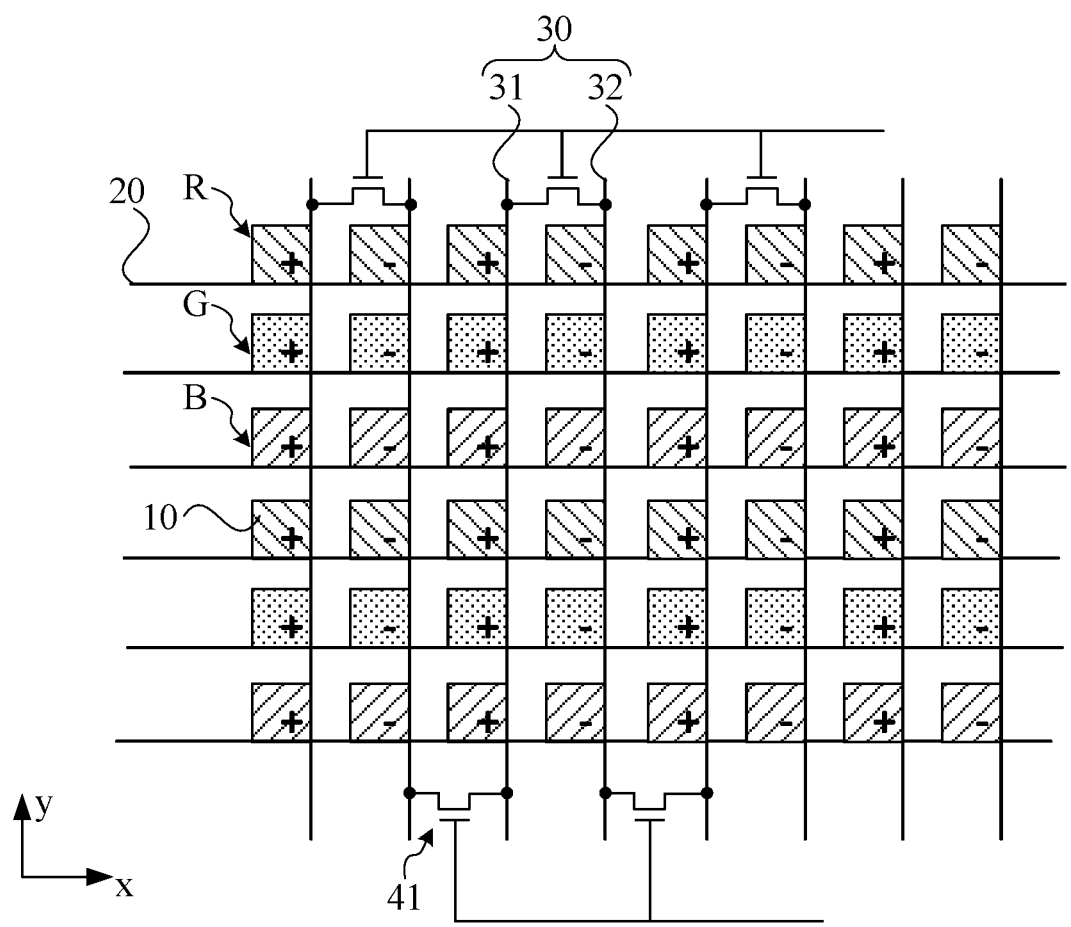
FIG. 6 is an equivalent circuit diagram illustrating the circuit structure of another array substrate according to embodiments of the present disclosure.

Exemplarily, FIG. 6 is an equivalent circuit diagram illustrating the circuit structure of another array substrate according to embodiments of the present disclosure. Referring to FIG. 6, along the row direction x, the even-numbered switch units are disposed below the pixel electrode array, and the odd-numbered switch units are disposed above the pixel electrode array. In this manner, the switch units can be disposed on the upper bezel and lower bezel of the array substrate 11, so that the neutralization efficiency of charges on data lines can be improved, the element density of the single-sided bezel can be reduced, and the problem of a relatively large frame caused by too many elements on the single-sided frame can be avoided. The "above" and "below" described herein are described at the angle shown in FIG. 6. For example, the "above" may correspond to the upper bezel of the array substrate 11 and the below may correspond to the lower bezel of the array substrate 11, and the arrangement of the switch units at the upper and lower bezels facilitates reduction of the bezel and conforms to the trend requirements of the current design of narrow bezel products.

In FIG. 6, it is to be noted that the even-numbered switch units disposed below the pixel electrode array and the odd-numbered switch units disposed above the pixel electrode array are only an example. In other embodiments, the even-numbered switch units may be disposed above the pixel electrode array, and the odd-numbered switch units may be disposed below the pixel electrode array. Alternatively, a plurality of consecutive switch units may be disposed below the pixel electrode array, and a plurality of consecutive switch units may be disposed above the pixel electrode array. Alternatively, the number of switch units disposed at two ends is not equal and there is no fixed rule. For example, a switch units are disposed below the pixel electrode array, b switch units are disposed above the pixel electrode array, and a+b=k−1, where a and b are each an integer. The specific implementation may be designed according to the actual situation.

On the basis of the above embodiment in which switch units are disposed on two sides of the pixel electrode array, more switch units may be further disposed so that any two adjacent data lines are connected through two switch units. In an embodiment of the present disclosure, the total number of the first data lines and the second data lines is m, the number of the switch units is 2(m−1), and the number of the switch units disposed on the first side of the pixel electrode array and the number of the switch units disposed on the second side of the pixel electrode array are each m−1, where m is an integer greater than or equal to 2.

Figure 7:
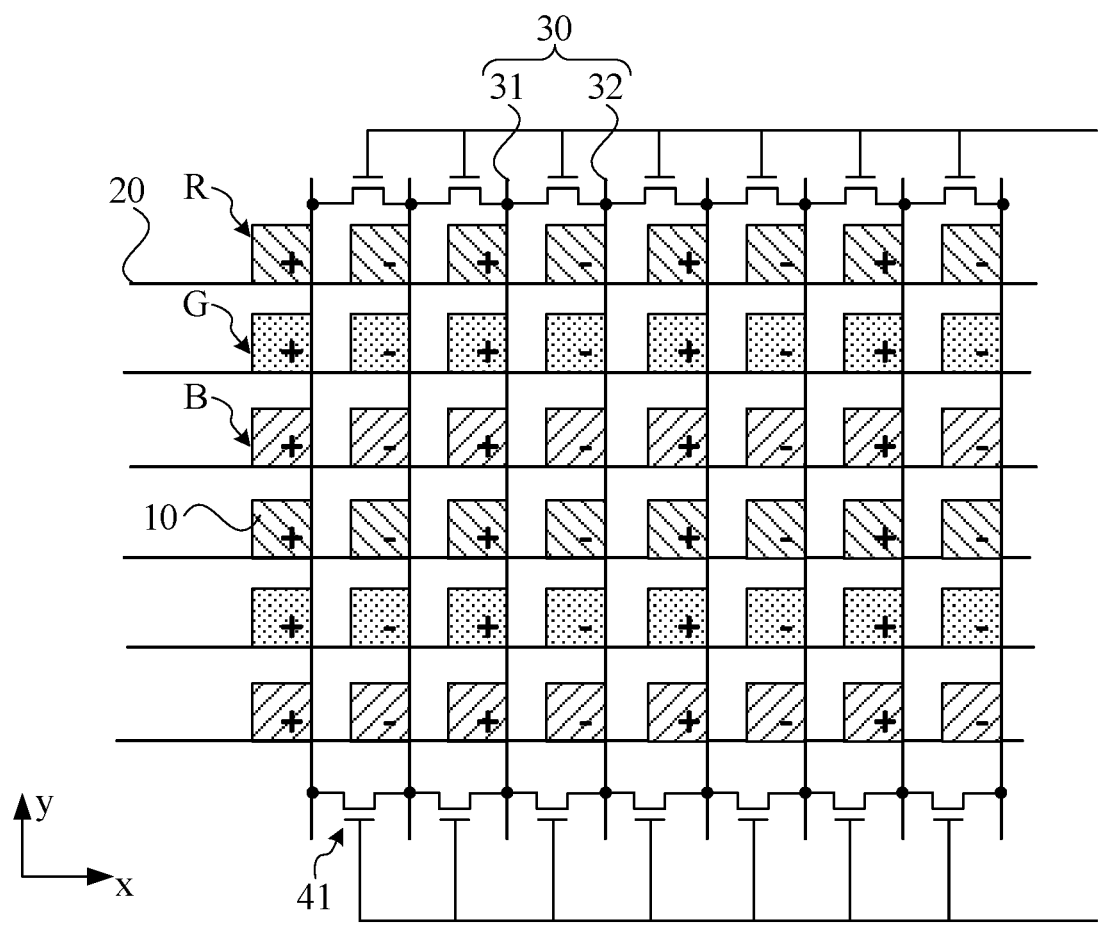
FIG. 7 is an equivalent circuit diagram illustrating the circuit structure of another array substrate according to embodiments of the present disclosure.

Exemplarily, FIG. 7 is an equivalent circuit diagram illustrating the circuit structure of another array substrate according to embodiments of the present disclosure. Referring to FIG. 7, exemplarily, FIG. 7 shows eight data lines, that is, first data lines 31 and second data lines are 4, separately. Two switch units 41 are disposed between each two adjacent data lines, one of the two switch units 41 is disposed above the pixel electrode array, and the other of the two switch units 41 is disposed below the pixel electrode array. The embodiment in FIG. 7 is provided with a larger number of switch units 41 and can be applied to embodiments in which the bezel of the array substrate has space for designing more switch units, and the ends, arranged on the same side of the pixel electrode array, of all data lines are configured to connect to each other at the reset stage. Therefore, it is beneficial to speed up the neutralization rate of charges at the reset stage, and also can improve the uniformity of the data lines during resetting. In other embodiments, other number of switch units 41 may be disposed. For example, only one switch unit 41 may be disposed between part of data lines, and an implementation may be designed according to the actual situation.

In an embodiment of the present disclosure, the total number of the first data lines and the second data lines is 2m, and the number of the switch units is m, where m is an integer greater than or equal to 2.

It is to be understood that in this embodiment, the number of data lines is even 2m, and the number of first data lines and the number of second data lines may each be m. By disposing m switch units, two ends of one switch unit are connected to a first data line and a second data line, respectively, so as to ensure the reset effect of the data lines at the reset stage. In an implementation, m switch units may be disposed only at one end of the data lines, or a certain number of switch units may be disposed at two ends of the data lines separately, and the specific position of each switch unit is not limited by this embodiment of the present disclosure.

In the previous embodiment, the number of data lines is 2m and the number of switch units is m. In this manner, the first data line and the 2m-th data line are each connected to only one adjacent data line, while the second data line to the (2m−1)-th data line are each connected to adjacent data lines on two sides. Therefore, the reset difference may be caused in response to an independent reset signal line being not disposed. To solve this problem, in an embodiment of the present disclosure, the pixel electrodes include a dummy pixel electrode, and the data lines further include a dummy data line connected to the dummy pixel electrode. At the reset stage, the dummy data line is configured to be connected to the first data line or the second data line through a switch unit corresponding to the dummy data line, and the drive voltage of the dummy data line is different from the drive voltage of data line connected to the dummy data line.

The dummy pixel electrode has the same structure as that of the pixel electrode, and a black matrix of the area corresponding to the dummy pixel electrode is not provided with an opening, so display does not perform. The dummy data line has the same structure as that of the data line. The circuit of the dummy data line coincides with that of the display area, and the pixel voltages are written in accordance with corresponding polarities. In an implementation, the pixel voltage in a dummy pixel electrode column may directly use a value of a remaining column or directly write an average value. In some embodiments, since the dummy pixel electrode is located in a non-display region, the dummy pixel electrode is not used for display, and functions such as an alignment mark may be implemented.

Figure 8:
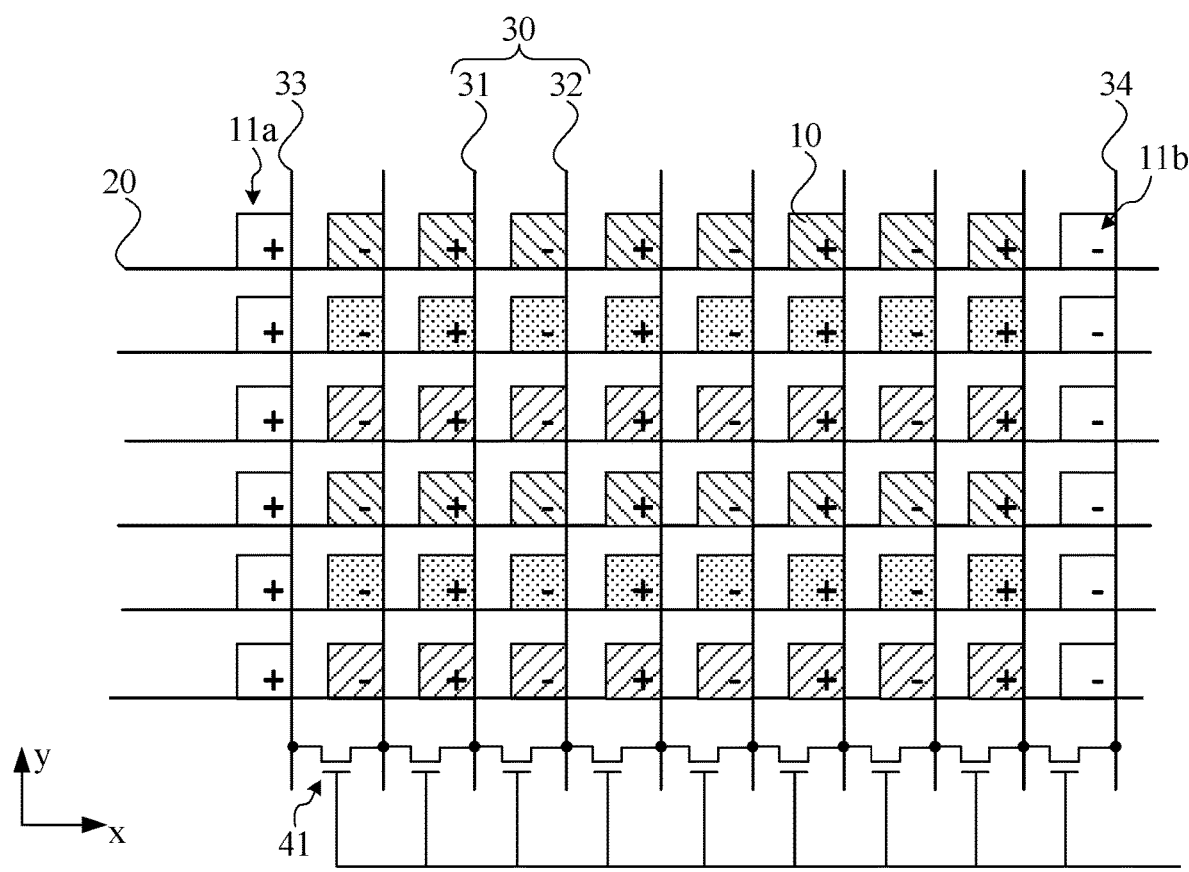
FIG. 8 is an equivalent circuit diagram illustrating the circuit structure of another array substrate according to embodiments of the present disclosure.

Exemplarily, FIG. 8 is an equivalent circuit diagram illustrating the circuit structure of another array substrate according to embodiments of the present disclosure. Referring to FIG. 8, FIG. 8 schematically shows a dummy pixel electrode column 11a and a dummy data line 33 located on the left, and a dummy pixel electrode column 11b and a dummy data line 34 located on the right. The dummy data line 33 is connected to a first data line through a switch unit 41, and the dummy data line 34 is connected to a last data line through a switch unit. The polarity of the drive voltage of the dummy data line 33 is opposite to polarities of drive voltages of adjacent data lines, and the polarity of the drive voltage of the dummy data line 34 is opposite to polarities of drive voltages of adjacent data lines. In this manner, it can be ensured that each data line is connected to at least two data lines with different polarities to ensure the reset effect.

In an embodiment of the present disclosure, with continued reference to FIG. 6, one of at least one data line 30 is correspondingly connected to two switch units 41, and the two switch units 41 are located on different sides of the data line 30, respectively. For example, in some embodiments, the length of the data lines is relatively long. Since the resistance effect of the data lines causes charges in the data lines to be released slowly, the switch units 40 are disposed at two ends of the one of at least one data line 30 to improve the charge neutralization efficiency and uniformity. Alternatively, embodiments similar to that in FIG. 7 are further provided, so as to maximize the reset effect of the data lines.

Figure 9:
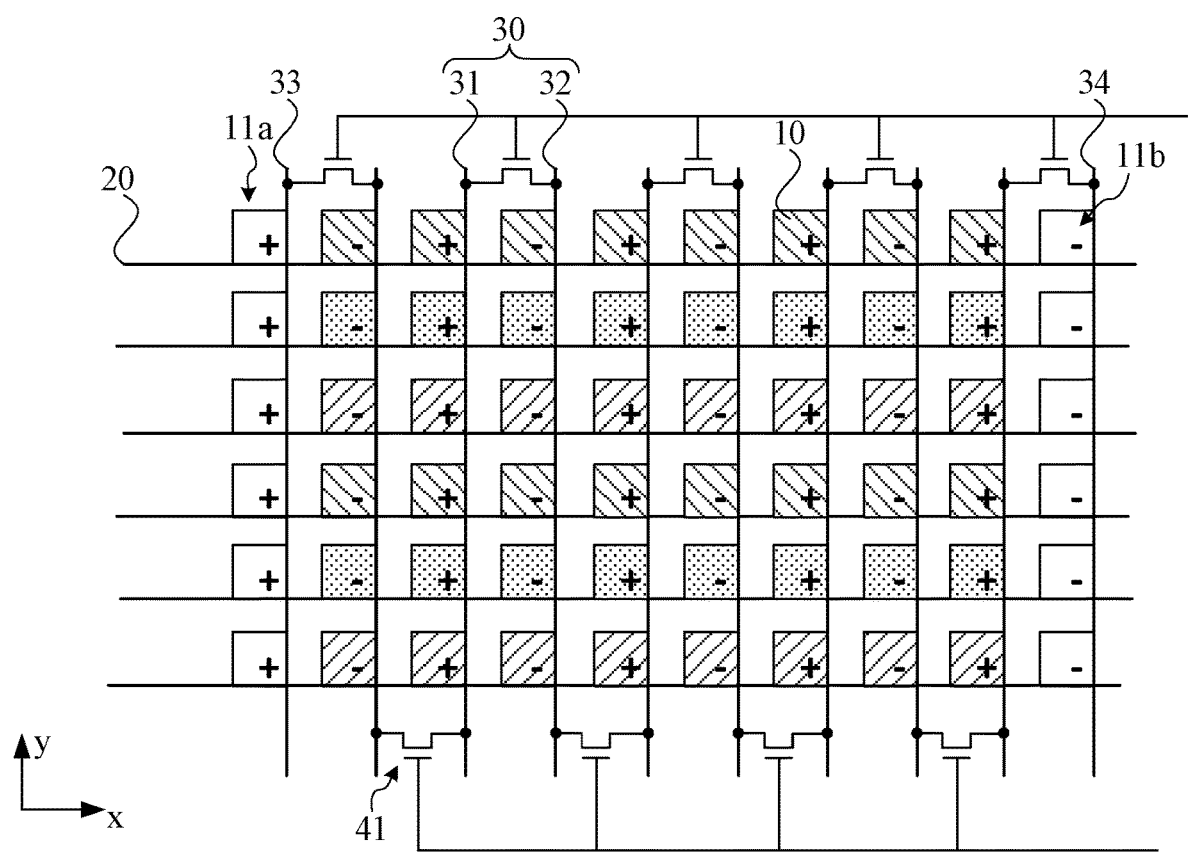
FIG. 9 is an equivalent circuit diagram illustrating the circuit structure of another array substrate according to embodiments of the present disclosure.

In other embodiments provided with the dummy pixel electrode, the switch units may also be disposed on two sides of the pixel electrode array. Exemplarily, FIG. 9 is an equivalent circuit diagram illustrating the circuit structure of another array substrate according to embodiments of the present disclosure. Referring to FIG. 9, similar to FIG. 6, a plurality of switch units 41 are respectively disposed on two sides of data lines. In another embodiment, a configuration similar to that of the switch units 41 in FIG. 7 may also be provided, which is not limited in this embodiment of the present disclosure.

With the improvement of the resolution of the spatial light modulator, the number of scan lines and the number of data lines are increasing. In response to the number of data lines being small, output terminals of the driver chip may correspond to the data lines one to one. In response to the number of data lines being large, a multiplexer can be used to load a drive signal to different data lines at different times, thereby reducing the number of output terminals of the driver chip and reducing the cost. The multiplexer works at the display stage. The technical solution of this embodiment of the present disclosure is to implement the short circuit of the first data line and the second data line at the reset stage, and the multiplexer can also be used. In an embodiment of the present disclosure, the array substrate further includes a plurality of multiplexers. The plurality of multiplexers includes at least two switches. The switches also serve as switch units.

Figure 10:
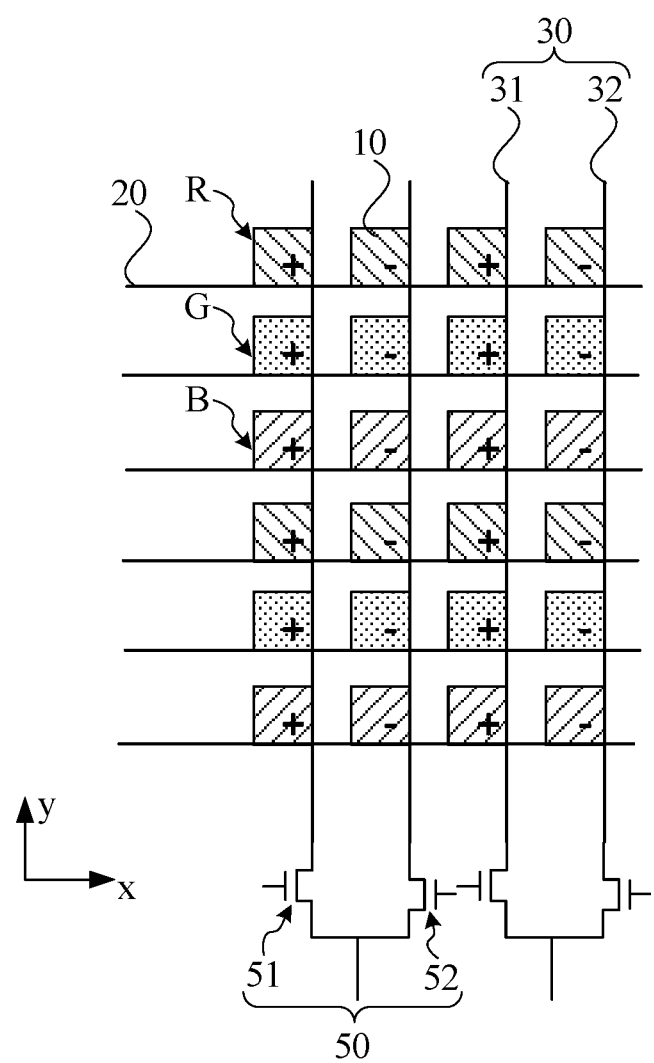
FIG. 10 is an equivalent circuit diagram illustrating the circuit structure of another array substrate according to embodiments of the present disclosure.

Exemplarily, FIG. 10 is an equivalent circuit diagram illustrating the circuit structure of another array substrate according to embodiments of the present disclosure. Referring to FIG. 10, the multiplexer includes two switches as an example. The array substrate includes a plurality of multiplexers 50, and each multiplexer 50 includes a first switch 51 and a second switch 52. The first terminal of the first switch 51 is connected to the first data line 31, the first terminal of the second switch 52 is connected to the second data line 32, the second terminal of the first switch 51 is connected to the second terminal of the second switch 52, and a control terminal of the first switch 51 and a control terminal of the second switch 52 are respectively connected to corresponding timing control terminals. At the display stage, the two timing control terminals are configured to control the first switch 51 and the second switch 52 to be turned on at different time so as to write corresponding data signals. At the reset stage, the two timing control terminals are configured to respectively control the first switch 51 and the second switch 52 to turn on at the same time, so that the first data line 31 is configured to connect to the second data line 32. Since the reset stage and the display stage are respectively located in different time period, switches in multiplexers 50 may also serve as switch units, only the output timing of the timing control terminals needs to be changed, and there is no need to provide switch units respectively connected to the first data line and the second data line, thereby facilitating the simplification of the structure of the array substrate.

In the above embodiments, the first data line and the second data line are adjacent as examples. These embodiments are not a limitation on embodiments of the present disclosure, and in an embodiment of the present disclosure, the first data line and the second data line are not adjacent.

The following is to be understood: That the first data line and the second data line are not adjacent to each other means that at least one data line is spaced between the first data line and the second data line. In this embodiment, polarities of drive voltages of adjacent data lines are opposite as an example, there needs to be spaced even-numbered data lines between a first data line and a second data line. In an embodiment of the present disclosure, when pixel electrodes are driven, loaded drive voltages of two adjacent data lines are different in the same frame. 2n data lines are spaced between a first data line and a second data line, where n is a positive integer.

Figure 11:
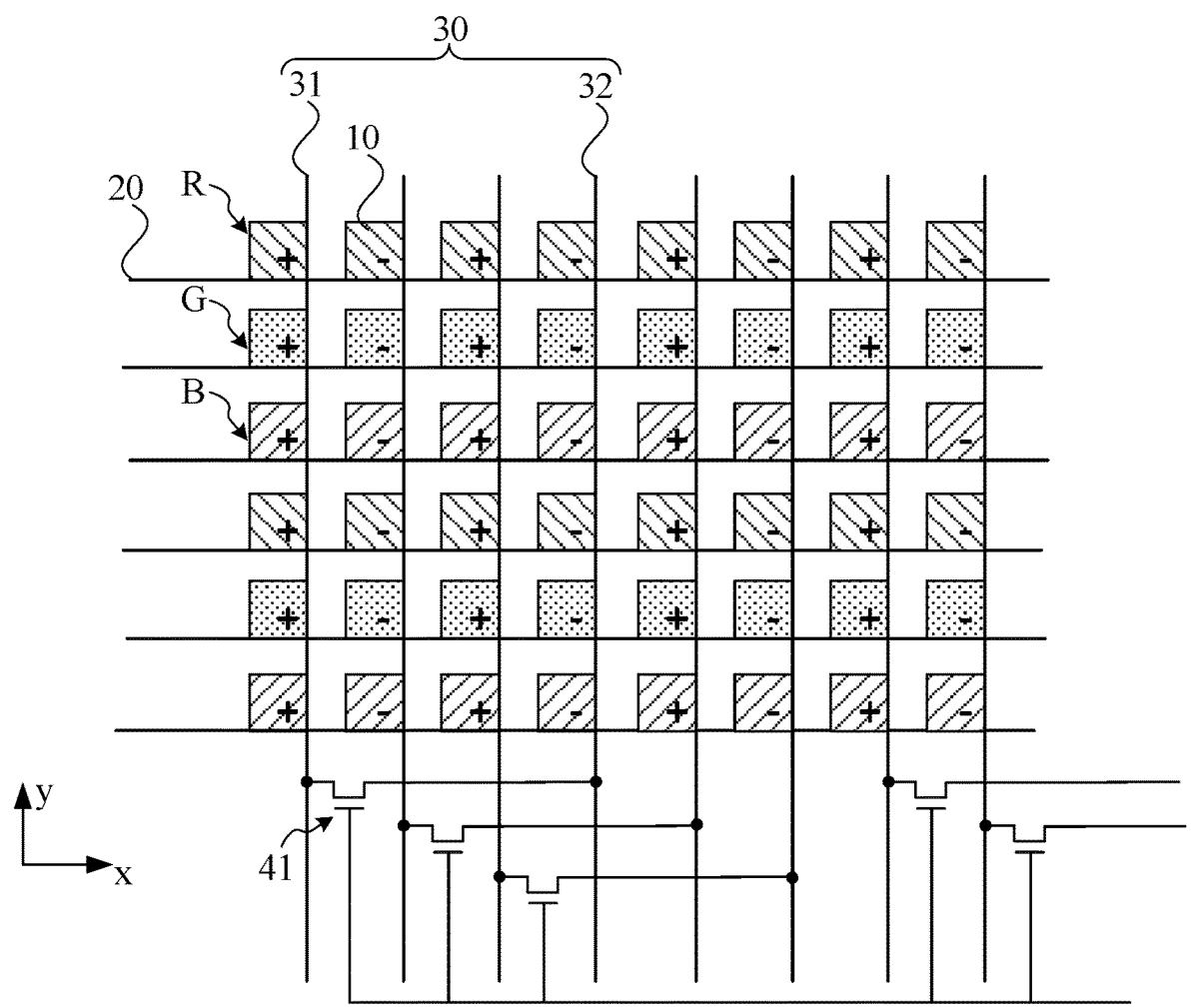
FIG. 11 is an equivalent circuit diagram illustrating the circuit structure of another array substrate according to embodiments of the present disclosure.

Exemplarily, FIG. 11 is an equivalent circuit diagram illustrating the circuit structure of another array substrate according to embodiments of the present disclosure. Referring to FIG. 11, two data lines are spaced between a first data line 31 and a second data line 32. In an embodiment of the present disclosure, the array substrate further includes a plurality of switch units. The number of first data lines and the number of second data lines are each p, and the number of switch units is p, where p is an integer greater than or equal to 3. At the reset stage, the first data line 31 is configured to connect to the second data line 32 through switch units 41. At the display stage, the first data line 31 is disconnected from the second data line 32, the scan lines 20 are configured to perform a progressive scan to control the data lines 30 to connect to a row of pixel electrodes 10 which are being scanned, different data lines 30 are connected to different pixel electrodes 10, and the data lines 30 are configured to charge the pixel electrodes 10.

In another embodiment, switch units may be disposed on two sides of the pixel electrode array. In an embodiment of the present disclosure, the array substrate further includes a plurality of switch units, the number of first data lines and the number of second data lines are each p, the number of switch units is 2p, and the number of switch units disposed on the first side of the pixel electrode array and the number of switch units disposed on the second side of the pixel electrode array are each p, where p is an integer greater than or equal to 3.

Figure 12:
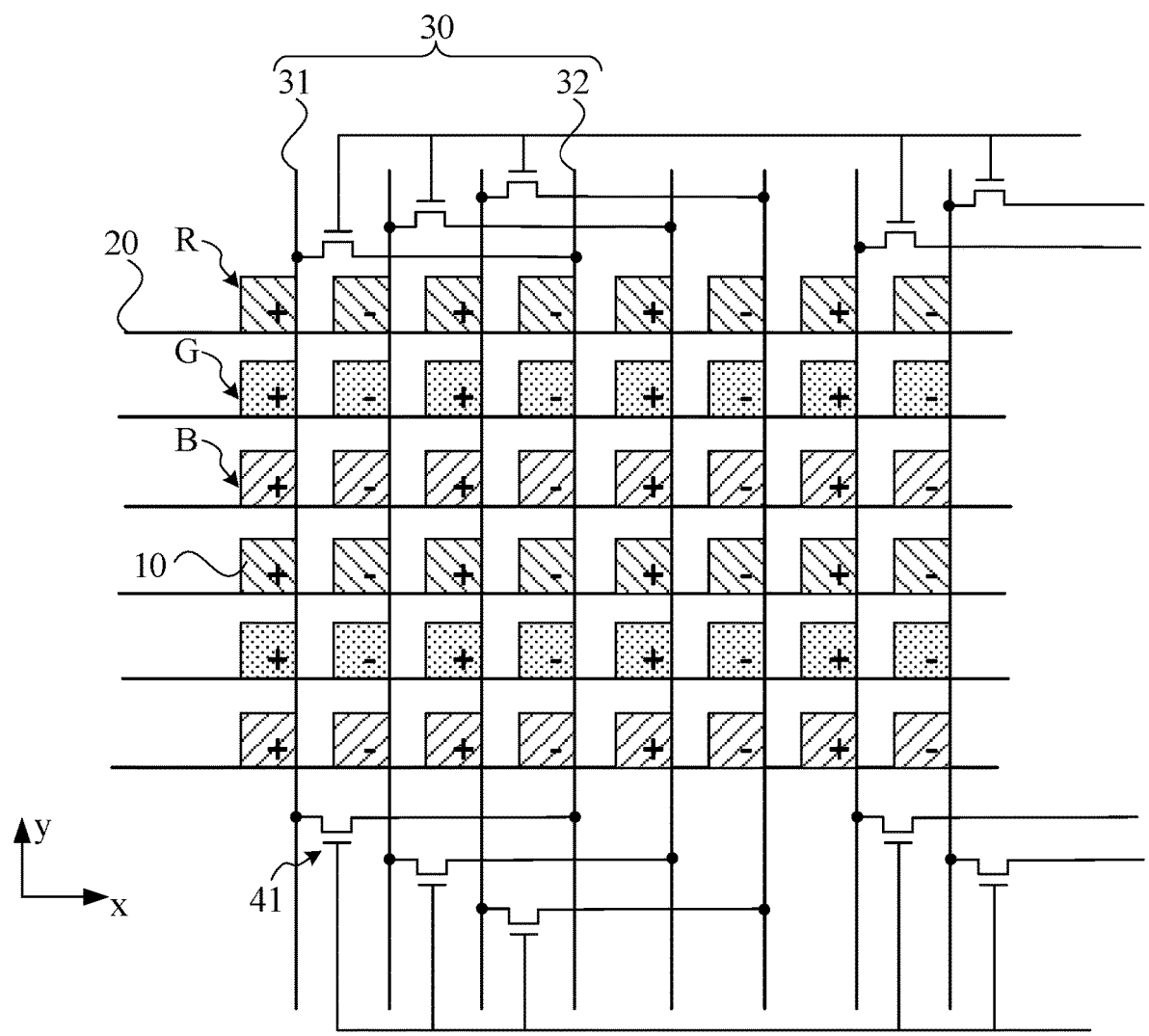
FIG. 12 is an equivalent circuit diagram illustrating the circuit structure of another array substrate according to embodiments of the present disclosure.

Exemplarily, FIG. 12 is an equivalent circuit diagram illustrating the circuit structure of another array substrate according to embodiments of the present disclosure. Referring to FIG. 12, two data lines are spaced between a first data line 31 and a second data line 32 as an example, this embodiment differs from the embodiment in FIG. 11 in that two ends of each data line are provided with switch units 41, in this manner, the charge neutralization efficiency and uniformity is conducive to improving.

It is to be noted that, in response to the first data line and the second data line being not adjacent to each other, the setting position of the switch units may be similar to the setting manner in the foregoing embodiment. For example, the switch units may be disposed at two ends of the data lines at intervals along the row direction, and corresponding dummy pixel electrodes may be designed as required, and the details are not repeated here.

Figure 13:
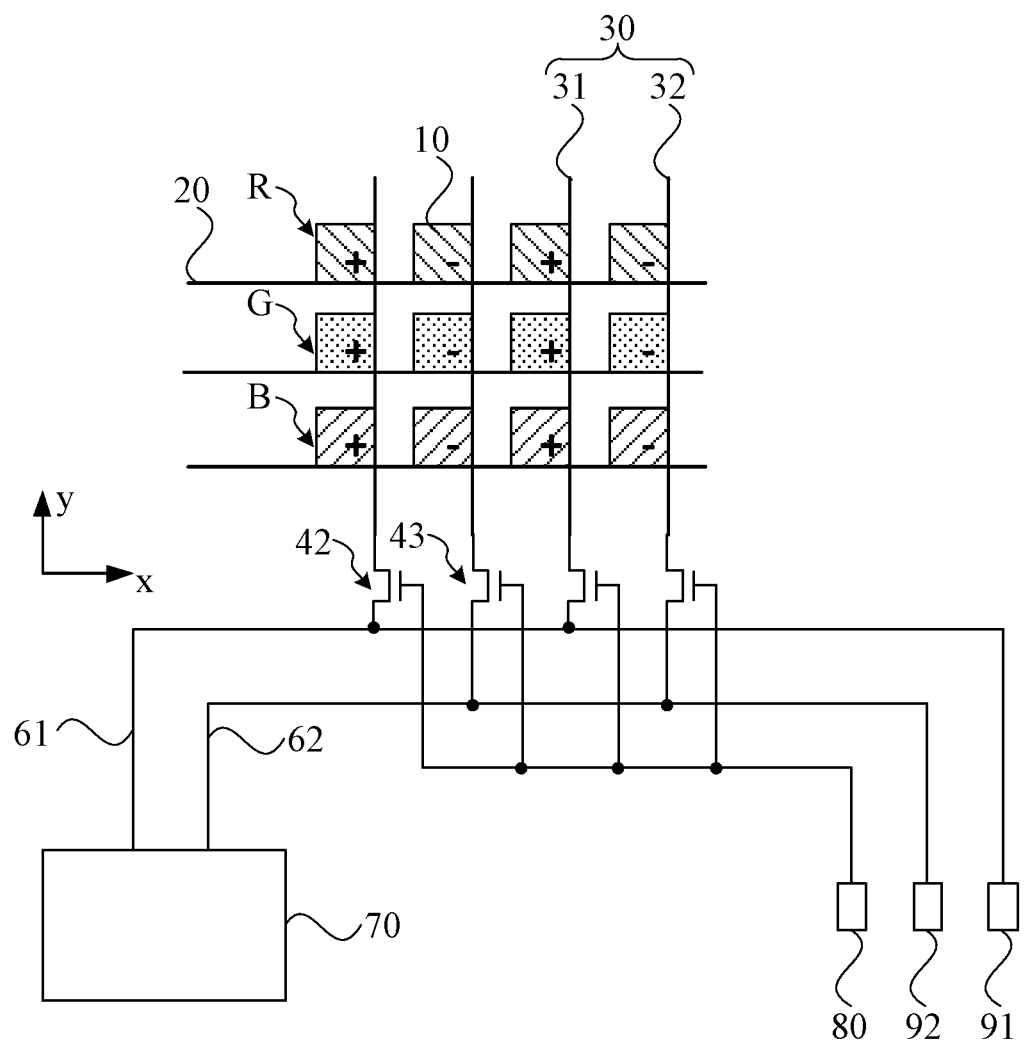
FIG. 13 is an equivalent circuit diagram illustrating the circuit structure of another array substrate according to embodiments of the present disclosure.

FIG. 13 is an equivalent circuit diagram illustrating the circuit structure of another array substrate according to embodiments of the present disclosure. Referring to FIG. 13, in an embodiment of the present disclosure, the array substrate according to this embodiment further includes a plurality of first switch units 42, a plurality of second switch units 43, a first test line 61, a second test line 62, and a connection unit 70. The first terminal of one first switch unit 42 is connected to an odd-numbered data line, and the second terminal of the first switch unit 42 is connected to the first test line 61. The first terminal of one second switch unit 43 is connected to an even-numbered data line, and the second terminal of the second switch unit 43 is connected to the second test line 62. The control terminal of the first switch unit 42 and the control terminal of the second switch unit 43 are each connected to a control signal terminal 80. At the reset stage, the first test line 61 and the second test line 62 are connected through the connection unit 70, and the control signal terminal 80 is configured to control the first switch unit 42 and the second switch unit 43 to turn on. At the display stage, the scan lines 20 are configured to perform a progressive scan to control the data lines 30 to connect to a row of pixel electrodes 10 which are being scanned, different data lines 30 are connected to different pixel electrodes 10, the data lines 30 are configured to charge the pixel electrodes 10, and the control signal terminal 80 is configured to control the first switch unit 42 and the second switch unit 43 to turn off.

Figure 14:
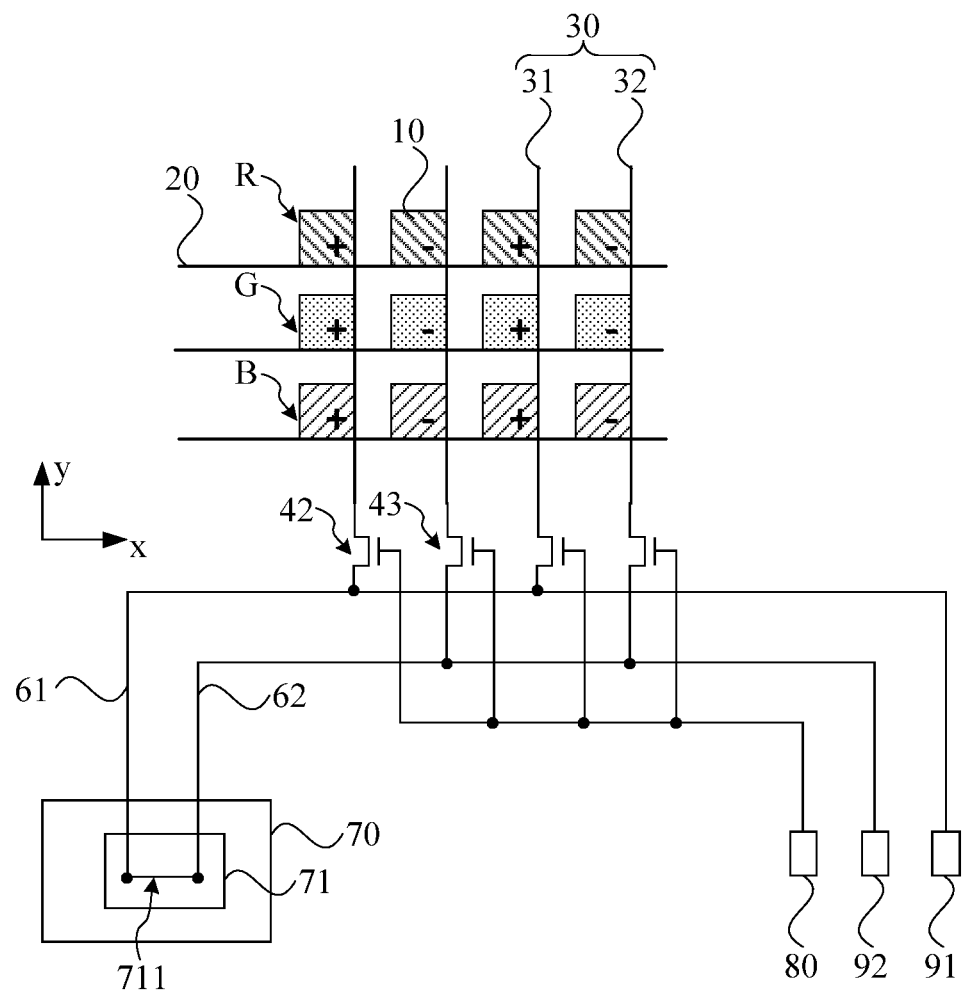
FIG. 14 is an equivalent circuit diagram illustrating the circuit structure of another array substrate according to embodiments of the present disclosure.
Figures 15, 16:
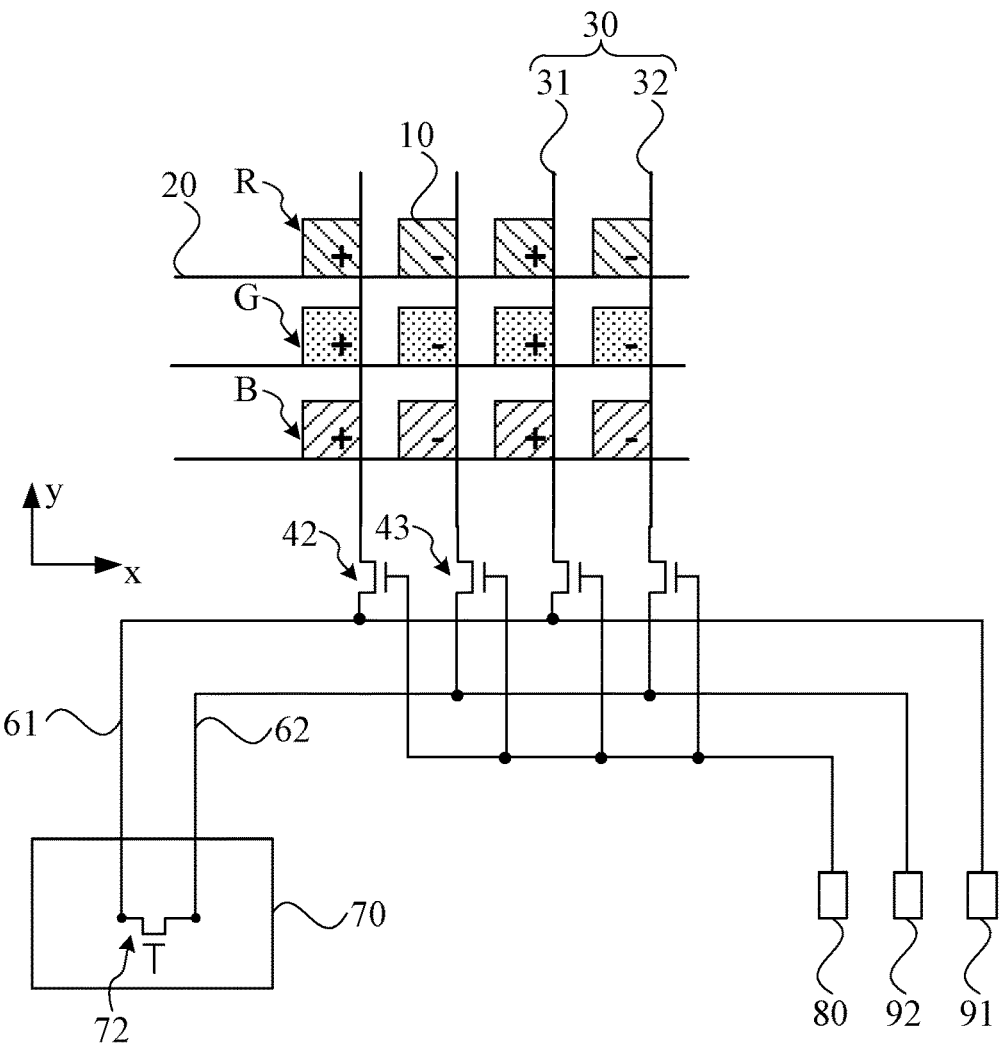
FIG. 15 is an equivalent circuit diagram illustrating the circuit structure of another array substrate according to embodiments of the present disclosure.
FIG. 16 is a flowchart illustrating a driving method of an array substrate according to embodiments of the present disclosure.

In this embodiment, the first switch units 42 and the second switch units 43 are transistors of the same type, so that the same signal control terminal 80 may be used to control the turn-on or turn-off of the first switch units 42 and the second switch units 43 at the same time. The connecting unit 70 is configured to connect the first test line 61 to the second test line 62 at the reset stage. This embodiment of the present disclosure does not limit the type of the connection unit. Exemplarily, FIG. 14 is an equivalent circuit diagram illustrating the circuit structure of another array substrate according to embodiments of the present disclosure. Referring to FIG. 14, in a certain embodiment, the connection unit 70 may include a circuit board 71, for example, a flexible printed circuit (FPC). The circuit board includes an auxiliary connection line 711. At the reset stage, the first test line 61 and the second test line 62 are configured to be electrically connected through the auxiliary connection line 711. FIG. 15 is an equivalent circuit diagram illustrating the circuit structure of another array substrate according to embodiments of the present disclosure. Referring to FIG. 15, in another embodiment, the connection unit 70 may include a third switch unit 72, the first terminal of the third switch unit 72 is connected to the first test line 61, and the second terminal of the third switch unit 72 is connected to the second test line 62. In response to the type of the third switch unit 72 and the type of the first switch unit 42 being the same type of transistors, a control terminal of the third switch unit 72 may be connected to the signal control terminal 80. At the reset stage, the third switch unit 72 is turned on, and the first test line 61 and the second test line 62 are configured to be electrically connected through the third switch unit 72.

In the embodiment of FIG. 13, the first switch units 42 are connected to odd-numbered data lines, and the second switch units are connected to even-numbered data lines, and may also be used for a display test (VT test). With continued reference to FIG. 13, in an embodiment of the present disclosure, the array substrate further includes a first display test terminal 91 and a second display test terminal 92. The first display test terminal 91 is connected to the first test line 61, and the second display test terminal 92 is connected to the second test line 62. The control signal terminal 80 also serves as a display test control terminal. At the display test stage of pixels in an odd-numbered column, the first display test terminal 91 is configured to output a first display test signal, the display test control terminal is configured to control a corresponding switch unit 42 to turn on, and the first display test signal is configured to be transmitted to the odd-numbered data line through the first test line 61. At the display test stage of pixels in an even-numbered column, the second display test terminal 92 is configured to output a second display test signal, the display test is configured to control terminal controls the second switch units 43 to turn on, and the second display test signal is configured to be transmitted to the even-numbered data line through the second test line 62, thereby implementing the VT test of sub-pixels. A VT test circuit and a reset circuit also serve in this embodiment, thereby simplifying the circuit structure and reducing the difficulty of technique.

FIG. 16 is a flowchart illustrating a driving method of an array substrate according to embodiments of the present disclosure. The driving method is applied to the array substrate according to any one of the embodiments described above. Referring to FIG. 16, the driving method according to this embodiment includes two steps.

In step S110, at the reset stage, a first data line is connected to a second data line.

The loaded drive voltage of the first data line and the loaded drive voltage of the second data line are different. In an implementation, the polarity of the loaded drive voltage of the first data line and the polarity of the loaded drive voltage of the second data lines may be opposite, and the first data lines may be adjacent or not adjacent.

In step S120, at the display stage, the first data line is disconnected from the second data line, scanning lines perform a progressive scan to control data lines to connect to a corresponding row of pixel electrodes, and the data lines charge the connected pixel electrodes.

In the driving method of the array substrate according to this embodiment of the present disclosure, the driving process of a frame is divided into the reset stage and display stage. At the reset stage, the first data line is configured to connect to the second data line so that charges between the first data line and the second data line are transferred, and the reset speed is accelerated. At the display stage, the first data line is disconnected from the second data line, the scanning lines perform a progressive scan to control the data lines to connect to a row of pixel electrodes which are being scanned, different data lines are connected to different pixel electrodes, and the data lines charge the connected pixel electrodes. Therefore, the driving of all sub-pixels is implemented, thereby solving the problems of large IC load and slow charging speed when the global pixel voltage of the spatial light modulator is reset.

Figure 17:
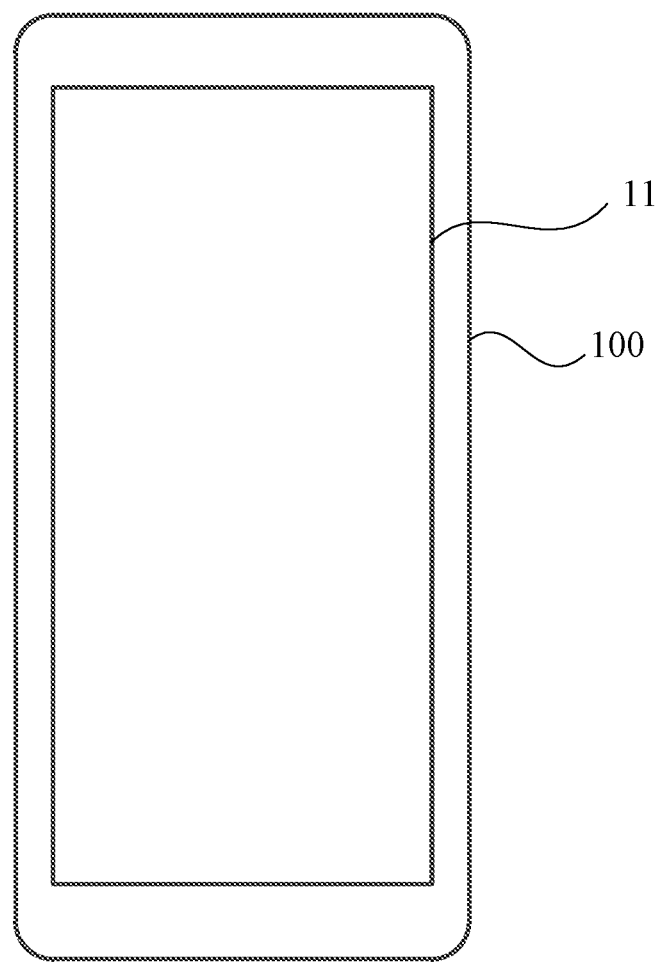
FIG. 17 is a flowchart illustrating a display device according to embodiments of the present disclosure.

Embodiments of the present disclosure further provide a display device including any of the array substrate according to the embodiments described above. FIG. 17 is a flowchart illustrating a display device according to embodiments of the present disclosure Since the display device 100 according to this embodiment of the present disclosure includes the array substrate according to any one of the embodiments described above, the display device 100 has the same or corresponding technical effects as the array substrate, and the details are not repeated here. In this embodiment of the present disclosure, the display device 100 may be a holographic three-dimensional display device, and the array substrate 11 is located in a liquid crystal spatial light modulator. Alternatively, the display device 100 may be a liquid crystal display device, for example, a mobile phone, a tablet, a wearable device, or the like. The array substrate 11 is located in the liquid crystal display device.

It is to be noted that the preceding are only preferred embodiments of the present disclosure and technical principles used therein. It is to be understood by those skilled in the art that the present disclosure is not limited to the embodiments described herein. For those skilled in the art, various apparent modifications, adaptations, combinations, and substitutions can be made without departing from the scope of the present disclosure. Therefore, while the present disclosure has been described in detail via the preceding embodiments, the present disclosure is not limited to the preceding embodiments and may include more equivalent embodiments without departing from the inventive concept of the present disclosure. The scope of the present disclosure is determined by the scope of the appended claims.

What is claimed is:

1. An array substrate, comprising:
   a plurality of pixel electrodes arranged in an array;
   a plurality of scan lines extending along a row direction of the array and arranged along a column direction of the array; and
   a plurality of data lines extending along the column direction and arranged along the row direction,
   wherein the plurality of data lines comprises at least one group of data lines, each of the at least one group of data lines comprises a first data line and a second data line, and a loaded drive voltage of the first data line and a loaded drive voltage of the second data line are different in a same frame; and
   wherein a driving process of one frame comprises a reset stage and a display stage,
   at the reset stage, the first data line is configured to be electrically connected to the second data line; and
   at the display stage, the first data line is configured to be disconnected from the second data line, the plurality of scan lines are configured to perform a progressive scan to control the plurality of data lines to be electrically connected to a corresponding row of pixel electrodes, and the plurality of data lines are configured to charge connected pixel electrodes.

2. The array substrate according to claim 1, wherein in the same frame and in each of the at least one group of data lines, a polarity of the loaded drive voltage of the first data line and a polarity of the loaded drive voltage of the second data line are opposite.

3. The array substrate according to claim 1, further comprising a plurality of switch units, wherein a first terminal of one of the plurality of switch units is electrically connected to the first data line, a second terminal of the one of the plurality of switch units is electrically connected to the second data line, a control terminal of the one of the plurality of switch units is configured to be electrically connected to a switch signal terminal, and the switch signal terminal is configured to control the one of the plurality of switch units to turn on at the reset stage.

4. The array substrate according to claim 1, wherein in each of the at least one group of data lines, the first data line and the second data line are disposed adjacent to each other.

5. The array substrate according to claim 3, wherein first data lines and second data lines of the plurality of data lines are alternately disposed along the row direction; and among the first data lines and the second data lines of the plurality of data lines, at least k consecutively adjacent first data lines and second data lines are electrically connected through k−1 switch units, wherein k is an integer greater than or equal to 2.

6. The array substrate according to claim 5, wherein along the row direction, a 2a-th switch unit of the k−1 switch units is disposed on a first side of the plurality of pixel electrodes arranged in the array and a (2a+1)-th switch unit of the k−1 switch units is disposed on a second side of the plurality of pixel electrodes arranged in the array, wherein the first side and the second side are opposite sides of the plurality of pixel electrodes arranged in the array in the column direction, and 2a+1 is a positive integer less than k.

7. The array substrate according to claim 3, wherein a total number of first data lines and second data lines of the plurality of data lines is m, a number of the plurality of switch units is 2(m−1), and a number of switch units disposed on a first side of the plurality of pixel electrodes arranged in the array and a number of switch units disposed on a second side of the plurality of pixel electrodes arranged in the array are each m−1, wherein m is an integer greater than or equal to 2.

8. The array substrate according to claim 3, wherein a total number of first data lines and second data lines of the plurality of data lines is 2m, and a number of the plurality of switch units is m, wherein m is an integer greater than or equal to 2.

9. The array substrate according to claim 1, wherein in each of the at least one group of data lines, the first data line and the second data line are not adjacent.

10. The array substrate according to claim 9, wherein drive voltages of two adjacent data lines of the plurality of data lines are different in the same frame when the plurality of pixel electrodes are being driven; and the first data line and the second data line are spaced by 2n data lines of the plurality of data lines, wherein n is a positive integer.

11. The array substrate according to claim 10, further comprising a plurality of switch units, wherein a number of first data lines of the plurality of data lines and a number of second data lines of the plurality of data lines are each p, and a number of the plurality of switch units is p, wherein p is an integer greater than or equal to 3.

12. The array substrate according to claim 3, wherein one of at least one of the plurality of data lines is correspondingly electrically connected to two of the plurality of switch units, and the two of the plurality of switch units are located on different sides of the one of the at least one of the plurality of data lines.

13. The array substrate according to claim 10, further comprising a plurality of switch units, wherein a number of first data lines of the plurality of data lines and a number of second data lines the plurality of data lines are each p, a number of the plurality of switch units is 2p, and a number of switch units disposed on a first side of the plurality of pixel electrodes arranged in the array and a number of switch units disposed on a second side of the plurality of pixel electrodes arranged in the array are each p, wherein p is an integer greater than or equal to 3.

14. The array substrate according to claim 3, wherein the plurality of pixel electrodes comprise a dummy pixel electrode, and the plurality of data lines further comprise a dummy data line electrically connected to the dummy pixel electrode, wherein at the reset stage, the dummy data line is configured to be electrically connected to the first data line or the second data line through a switch unit, and a drive voltage of the dummy data line is different from a drive voltage of the first data line or the second data line electrically connected to the dummy data line.

15. The array substrate according to claim 3, wherein the plurality of switch units comprise transistors of a same type, and control terminals of the plurality of switch units are configured to be electrically connected to the switch signal terminal through a same signal line.

16. The array substrate according to claim 3, further comprising a plurality of multiplexers, wherein one of the plurality of multiplexers comprises at least two switches; and the at least two switches further serve as switch units of the plurality of switch units.

17. The array substrate according to claim 1, further comprising a plurality of first switch units, a plurality of second switch units, a first test line, a second test line, and a connection unit, wherein a first terminal of each of the plurality of first switch units is electrically connected to a respective odd-numbered data line of the plurality of data lines, a second terminal of each of the plurality of first switch units is electrically connected to the first test line, a first terminal of each of the plurality of second switch units is electrically connected to a respective even-numbered data line of the plurality of data lines, a second terminal of each of the plurality of second switch units is electrically connected to the second test line, and a control terminal of each of the plurality of first switch units and a control terminal of each of the plurality of second switch units are each configured to be electrically connected to a control signal terminal;

at the reset stage, the first test line and the second test line are electrically connected through the connection unit, and the control signal terminal is configured to control each of the plurality of first switch units and each of the plurality of second switch units to turn on; and at the display stage, the control signal terminal is configured to control each of the plurality of first switch units and each of the plurality of second switch units to turn off.

18. The array substrate according to claim 17, further comprising a first display test terminal and a second display test terminal, wherein the first display test terminal is electrically connected to the first test line, and the second display test terminal is electrically connected to the second test line;

the control signal terminal is further configured to serve as a display test control terminal;

at a display test stage of pixels in an odd-numbered column, the first display test terminal is configured to output a first display test signal, the display test control terminal is configured to control a first switch unit electrically connected to the pixels in the odd-numbered column to turn on, and the first display test signal is configured to be transmitted to the odd-numbered data line through the first test line; and at a display test stage of pixels in an even-numbered column, the second display test terminal is configured to output a second display test signal, the display test control terminal is configured to control a second switch unit electrically connected to the pixels in the even-numbered column to turn on, and the second display test signal is configured to be transmitted to the even-numbered data line through the second test line.

19. The array substrate according to claim 17, wherein the connection unit comprises a circuit board, and the circuit board comprises an auxiliary connection line, wherein at the reset stage, the first test line and the second test line are electrically connected through the auxiliary connection line.

20. A driving method of an array substrate, comprising:

at a reset stage of a driving process of one frame, connecting a first data line to a second data line, wherein the first data line and the second data line are included in each of at least one group of data lines from the plurality of data lines, a loaded drive voltage of the first data line and a loaded drive voltage of the second data line are different in a same frame, the array substrate comprises a plurality of pixel electrodes arranged in an array, a plurality of scan lines extending along a row direction of the array and arranged along a column direction of the array, and a plurality of data lines extending along the column direction and arranged along the row direction; and at a display stage of the driving process of the frame, disconnecting the first data line from the second data line, performing progressive scan, by the plurality of scan lines, to control the plurality of data lines to be electrically connected to a corresponding row of pixel electrodes, and charging, by the plurality of data lines, connected pixel electrodes.

21. A display device, comprising an array substrate comprising:

a plurality of pixel electrodes arranged in an array;

a plurality of scan lines extending along a row direction of the array and arranged along a column direction of the array; and a plurality of data lines extending along the column direction and arranged along the row direction, wherein the plurality of data lines comprises at least one group of data lines, each of the at least one group of data lines comprises a first data line and a second data line, and a loaded drive voltage of the first data line and a loaded drive voltage of the second data line are different in a same frame; and wherein a driving process of one frame comprises a reset stage and a display stage, at the reset stage, the first data line is configured to be electrically connected to the second data line; and at the display stage, the first data line is configured to be disconnected from the second data line, the plurality of scan lines are configured to perform a progressive scan to control the plurality of data lines to be electrically connected to a corresponding row of pixel electrodes, and the plurality of data lines are configured to charge connected pixel electrodes.

* * * * *